(12) United States Patent
Schreter (10) Patent No.: US 11,188,241 B2
(45) Date of Patent: Nov. 30, 2021

(54) HYBRID KEY-VALUE STORE

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 298 days.

(21) Appl. No.: 16/029,458

(22) Filed: Jul. 6, 2018

(65) Prior Publication Data

US 2019/0012336 A1    Jan. 10, 2019

Related U.S. Application Data

(60) Provisional application No. 62/530,075, filed on Jul. 7, 2017.

(51) Int. Cl.
*G06F 17/00* (2019.01)
*G06F 3/06* (2006.01)
(Continued)

(52) U.S. Cl.
CPC .......... *G06F 3/0631* (2013.01); *G06F 3/0604* (2013.01); *G06F 3/064* (2013.01); *G06F 3/067* (2013.01); *G06F 3/0608* (2013.01); *G06F 3/0611* (2013.01); *G06F 3/0644* (2013.01); *G06F 3/0652* (2013.01); *G06F 3/0659* (2013.01); *G06F 3/0673* (2013.01); *G06F 11/1446* (2013.01); *G06F 11/1471* (2013.01); *G06F 11/1658* (2013.01); *G06F 12/0802* (2013.01); *G06F 12/1009* (2013.01); *G06F 16/128* (2019.01); *G06F 16/134* (2019.01); *G06F 16/162* (2019.01); *G06F 16/176* (2019.01); *G06F 16/1824* (2019.01); *G06F 16/215* (2019.01); *G06F 16/2358* (2019.01); *G06F 16/245* (2019.01); *G06F 16/24552* (2019.01); *G06F 16/27* (2019.01); *G06F 16/951* (2019.01); *H04L 67/1097* (2013.01); *H04L 67/2809* (2013.01); *H04L 67/2842* (2013.01); *H04L 69/40* (2013.01);
(Continued)

(58) Field of Classification Search
None
See application file for complete search history.

(56) References Cited

U.S. PATENT DOCUMENTS

| 5,758,334 A | 5/1998 | Knight, III |
| 5,878,431 A | 3/1999 | Potterveld et al. |

(Continued)

*Primary Examiner* — Hasanul Mobin
(74) *Attorney, Agent, or Firm* — Mintz Levin Cohn Ferris Glovsky and Popeo, P.C.

(57) ABSTRACT

A method for storing a key-value pair can include dividing the key-value pair into a first data record and a second data record. The first data record can include a key associated with the key-value pair. The second data record can include a portion of a value associated with the key-value pair. The second data record can be stored in a secondary data store based on a size of the second data record exceeding a threshold value. The first data record can be stored in an in-memory key-value store based on a size of the first data record not exceeding the threshold value. The first data record can include a reference to the second data record in the secondary data store. A query requiring the key-value pair can be executed by retrieving the first data record from the in-memory key-value store. Related systems and articles of manufacture are also provided.

20 Claims, 7 Drawing Sheets

(51) Int. Cl.
  *G06F 16/11* (2019.01)
  *H04L 29/14* (2006.01)
  *G06F 11/14* (2006.01)
  *H04L 29/08* (2006.01)
  *G06F 16/2455* (2019.01)
  *G06F 12/0802* (2016.01)
  *G06F 16/16* (2019.01)
  *G06F 16/182* (2019.01)
  *G06F 16/176* (2019.01)
  *G06F 16/13* (2019.01)
  *G06F 12/1009* (2016.01)
  *G06F 16/951* (2019.01)
  *G06F 16/27* (2019.01)
  *G06F 16/23* (2019.01)
  *G06F 11/16* (2006.01)
  *G06F 16/245* (2019.01)
  *G06F 16/215* (2019.01)

(52) U.S. Cl.
  CPC ...... *G06F 2201/84* (2013.01); *G06F 2201/85* (2013.01); *G06F 2212/604* (2013.01); *G06F 2212/652* (2013.01)

(56) References Cited

U.S. PATENT DOCUMENTS

| | | | |
|---|---|---|---|
| 7,337,214 B2 | 2/2008 | Douglass | |
| 7,849,223 B2 | 12/2010 | Malkhi et al. | |
| 8,627,422 B2 | 1/2014 | Hawkes | |
| 8,760,460 B1 | 6/2014 | Kilgariff | |
| 9,087,020 B1 | 7/2015 | Amacker | |
| 9,622,204 B2 | 4/2017 | Lindheimer | |
| 9,734,021 B1* | 8/2017 | Sanocki | H04L 41/0654 |
| 9,785,510 B1* | 10/2017 | Madhavarapu | G06F 3/065 |
| 9,928,264 B2* | 3/2018 | Lomet | G06F 16/2322 |
| 9,971,526 B1* | 5/2018 | Wei | G06F 16/2228 |
| 10,158,642 B2 | 12/2018 | Jujjuri | |
| 10,298,640 B1 | 5/2019 | Luke | |
| 10,474,656 B1* | 11/2019 | Bronnikov | G06F 3/0649 |
| 10,489,387 B1 | 11/2019 | Rogynskyy | |
| 10,552,309 B2* | 2/2020 | Gschwind | G06F 12/023 |
| 2004/0088413 A1 | 5/2004 | Bhogi | |
| 2005/0223005 A1 | 10/2005 | Shultz | |
| 2006/0045111 A1 | 3/2006 | Sinha | |
| 2006/0053376 A1 | 3/2006 | Ng | |
| 2006/0218228 A1 | 9/2006 | Mouline | |
| 2006/0271705 A1 | 11/2006 | Garcia-Luna-Aceves | |
| 2007/0083675 A1 | 4/2007 | Vemulapelli | |
| 2008/0228872 A1 | 9/2008 | Bock | |
| 2009/0150566 A1 | 6/2009 | Malkhi et al. | |
| 2009/0216936 A1 | 8/2009 | Chu | |
| 2009/0287975 A1 | 11/2009 | Kim | |
| 2010/0002506 A1 | 1/2010 | Cho | |
| 2010/0027351 A1 | 2/2010 | Seol | |
| 2010/0293140 A1 | 11/2010 | Nishiyama | |
| 2011/0197023 A1 | 8/2011 | Iwamitsu | |
| 2012/0102298 A1* | 4/2012 | Sengupta | G06F 12/0864 711/216 |
| 2012/0246190 A1* | 9/2012 | Surtani | G06F 16/27 707/769 |
| 2013/0080348 A1 | 3/2013 | Pantaliano | |
| 2013/0268770 A1* | 10/2013 | Hunt | G06F 16/2255 713/189 |
| 2013/0275656 A1* | 10/2013 | Talagala | G06F 12/0246 711/103 |
| 2013/0275818 A1 | 10/2013 | Okubo | |
| 2014/0012891 A1 | 1/2014 | Wong | |
| 2014/0059290 A1 | 2/2014 | Ross | |
| 2014/0215179 A1 | 7/2014 | Matsuhira | |
| 2014/0279920 A1 | 9/2014 | Madhavarapu | |
| 2014/0289358 A1 | 9/2014 | Lindamood et al. | |
| 2014/0304409 A1* | 10/2014 | Kamath | H04L 63/166 709/225 |
| 2015/0058291 A1 | 2/2015 | Earl | |
| 2015/0089185 A1* | 3/2015 | Brandyberry | G06F 11/2058 711/207 |
| 2015/0310035 A1 | 10/2015 | Godman | |
| 2015/0310401 A1 | 10/2015 | Siracusa | |
| 2016/0026672 A1 | 1/2016 | Zhang | |
| 2016/0092593 A1 | 3/2016 | Peacock | |
| 2016/0098876 A1 | 4/2016 | Oz | |
| 2016/0105471 A1 | 4/2016 | Nunes et al. | |
| 2016/0203102 A1* | 7/2016 | Meng | H04L 67/1097 709/212 |
| 2016/0224580 A1 | 8/2016 | Jain | |
| 2016/0261395 A1 | 8/2016 | Agarwal | |
| 2016/0308968 A1 | 10/2016 | Friedman | |
| 2016/0374118 A1 | 12/2016 | Mestanov | |
| 2017/0134276 A1 | 5/2017 | White | |
| 2017/0134947 A1 | 5/2017 | Nilsson | |
| 2017/0139596 A1* | 5/2017 | Hack | G06F 3/0673 |
| 2017/0169069 A1 | 6/2017 | Manjunath | |
| 2017/0230451 A1 | 8/2017 | Paramasivam | |
| 2017/0295061 A1 | 10/2017 | Wittenschlaeger | |
| 2018/0011892 A1* | 1/2018 | Kimura | G06F 16/2246 |
| 2018/0011893 A1* | 1/2018 | Kimura | G06F 16/9027 |
| 2018/0227752 A1 | 8/2018 | Teyeb | |
| 2019/0005079 A1* | 1/2019 | Li | G06F 16/2272 |
| 2019/0102409 A1 | 4/2019 | Shi | |
| 2019/0171762 A1 | 6/2019 | Luke | |
| 2019/0205993 A1 | 7/2019 | Rodriguez | |
| 2019/0262719 A1 | 8/2019 | Wang | |
| 2019/0268308 A1 | 8/2019 | Sinha et al. | |
| 2020/0034353 A1 | 1/2020 | Innocenti | |
| 2020/0065300 A1 | 2/2020 | Yang | |
| 2020/0142788 A1 | 5/2020 | Hu | |

\* cited by examiner

HYBRID KEY-VALUE STORE

RELATED APPLICATION

This application claims priority to U.S. Provisional Application No. 62/530,075 entitled MULTI-CLOUD TOPOLOGY AND CONTAINER METADATA MANAGEMENT and filed on Jul. 7, 2017, the disclosure of which is incorporated herein by reference in its entirety.

TECHNICAL FIELD

The subject matter described herein relates generally to distributed computing and more specifically to hybrid key-value store in a distributed data storage system.

BACKGROUND

A distributed data storage system can store data across multiple computing nodes. These computing nodes can be located across different racks, availability zones, and/or data centers in the distributed data storage system. Furthermore, the distributed data storage system can be configured to store data from multiple tenants. Data from each individual tenant can be organized into one or more data partitions and stored in at least one data container. Moreover, each data partition can be stored in one of the computing nodes in the distributed data storage system. As such, locating data within the distributed data storage system, for example, in order to respond to a query (e.g., a structured query language (SQL) statement and/or the like), can require identifying the data partition and/or the data container holding the data. Alternatively and/or additionally, locating data within the distributed data storage system can require identifying the data center, availability zone, rack, and/or computing node storing the data.

SUMMARY

Systems, methods, and articles of manufacture, including computer program products, are provided for storing key-value pairs in a distributed data storage system. In one aspect, there is provided a system. The system may include at least one data processor and at least one memory. The at least one memory may store instructions that result in operations when executed by the at least one data processor. The operations may include: dividing, into a first data record and a second data record, a key-value pair, the first data record including a key associated with the key-value pair, the second data record including a first portion of a value associated with the key-value pair; storing, based at least a size of the second data record exceeding a threshold value, the second data record in a secondary data store; storing, based at least on a size of the first data record not exceeding the threshold value, the first data record in an in-memory key-value store, the first data record including a reference to the second data record in the secondary data store; and executing a query that requires the key-value pair by at least retrieving, from the in-memory key-value store, the first data record.

In some variations, one or more features disclosed herein including the following features can optionally be included in any feasible combination. The first data record can further include a second portion of the value associated with the key-value pair. The query can be executed based at least on the second portion of the value associated with the key-value pair.

In some variations, the execution of the query can require the first portion of the value associated with the key-value pair. The execution of the query can further include retrieving, based at least on the reference included in the first data record, the second data record from the secondary data store.

In some variations, the first data record can be stored in a first memory segment comprising the in-memory key-value store. At least a portion of memory space included in the first memory segment can be reclaimed in order to store the first data record in the first memory segment. The portion of the memory space can be reclaimed based at least on a third data record occupying the portion of the memory space being out-of-date, least recently used, and/or expired. The first data record in the first memory segment and a third data record in a second memory segment can be consolidated by at least moving the first data record and the third data record to a same memory segment.

In some variations, the first data segment can be allocated in order to store the first data record. In response of the allocation of the first data segment, a copy of the first data segment can be stored in the secondary data store. The copy of the first data segment can be stored as part of a snapshot of a hybrid key-value store comprising the in-memory key-value store and the secondary data store.

In some variations, in response to a modification of the key-value pair, a current version of the first data record corresponding to the modified key-value pair can be stored in the in-memory key-value store. The current version of the first data record can include a link to a previous version of the first data record that corresponds to key-value pair without the modification. The in-memory key-value store can be associated with an index that includes the current version of the first data record but not the previous version of the first data record. The execution of the query can include performing a lookup of the index to locate the current version of the first data record. The first data record can be associated with a version counter. A value of the version counter can enable a differentiation between the current version of the first data record and the previous version of the first data record.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A distributed data storage system can be configured to store data in the form of key-value pairs (KVPs). Each key-value pair can include a key that unique identifies a corresponding value. As such, any value in the distributed data storage system can be stored and retrieved based on a corresponding key. To eliminate single points of failure and increase fault tolerance, the distributed data storage system can store multiple replicas of the same key value pairs, for example, across different data centers, availability zones, racks, and/or computing nodes. Furthermore, to decrease latency for frequently accessed data, the distributed data storage system may store key-value pairs in an in-memory database. But in-memory storage may not be feasible for large sized values. As such, in some implementations of the current subject matter, a distributed data storage system can include a hybrid key-value store having in-memory storage for holding smaller values and secondary storage for holding larger values.

In some implementations of the current subject matter, storing a key-value pair in a hybrid key-value store can include dividing the key-value pair into a plurality of data records. This plurality of data records can include smaller sized data records (e.g., less than 2 kilobytes) that hold the key associated with the key-value pair, a portion of the value associated with the key-value pair, references (e.g., pointers, page list, and/or the like) to other portions of the value associated with the key-value pair, and/or metadata associated with the key-value pair. These smaller sized data records can be stored in an in-memory key-value store. Meanwhile, larger sized data records (e.g., greater than 2 kilobytes) holding larger portions of the value associated with the key-value pair can be stored in a secondary data store. According to some implementations of the current subject matter, memory space in the in-memory key-value store can be organized into fixed sized memory segments (e.g., 64 kilobytes and/or a different size). Data records in the in-memory key-value store can be stored in these fixed sized memory segments. For example, storing a new data record in the in-memory key-value store can include appending the new data record to a memory segment having sufficient free memory space to accommodate the new data record. A garbage collection process can be performed to identify and remove one or more data records, thereby reclaiming memory space in various memory segments of the in-memory key-value store for storing new data records added to the in-memory key-value store.

In some implementations of the current subject matter, each key-value pair in the hybrid key-value store can be associated with a version counter. The value of the version counter associated with a key-value pair may indicate the version of the key-value pair at the time when that key-value pair is added to the hybrid key-value store. Furthermore, the value of the version counter may increase whenever an updated version of the corresponding key-value pair is added to the hybrid key-value store. As such, the version counter can enable a differentiation between earlier versions and later version of the same key-value pair. It should be appreciated that each key-value pair can be associated with metadata that includes a value of a corresponding version counter. Moreover, the hybrid key-value store can be associated with an index structure, which may include references (e.g., pointers) to the most current version of each key-value pair in the hybrid key-value store as determined, for example, based on the version counter. Alternatively and/or additionally, in order to support multi-version concurrency control, each key-value pair can also be linked to earlier versions and/or later versions of key-value pairs with the same key.

In some implementations of the current subject matter, the hybrid key-value store can be used for storing the topology of the distributed data storage system. For example, the distributed data storage system can organize data from different tenants into one or more data containers, each of which holding at least one data partition from a tenant. Meanwhile, each data partition can be stored in one of a plurality of computing nodes located across different racks, availability zones, and/or data centers in the distributed data storage system. Accordingly, the topology of the distributed data storage system can include a plurality of objects including, for example, objects corresponding to different tenants, data containers, data partitions, data centers, availability zones, racks, computing nodes, and/or the like. Each of this plurality of objects can be stored as a key-value pair in the hybrid key-value store. Furthermore, at least a portion of the key-value pairs corresponding to the objects forming the topology of the distributed data storage system can be replicated and cached at different data centers, availability zones, racks, and/or computing nodes in the distributed data storage system.

Figure 1:
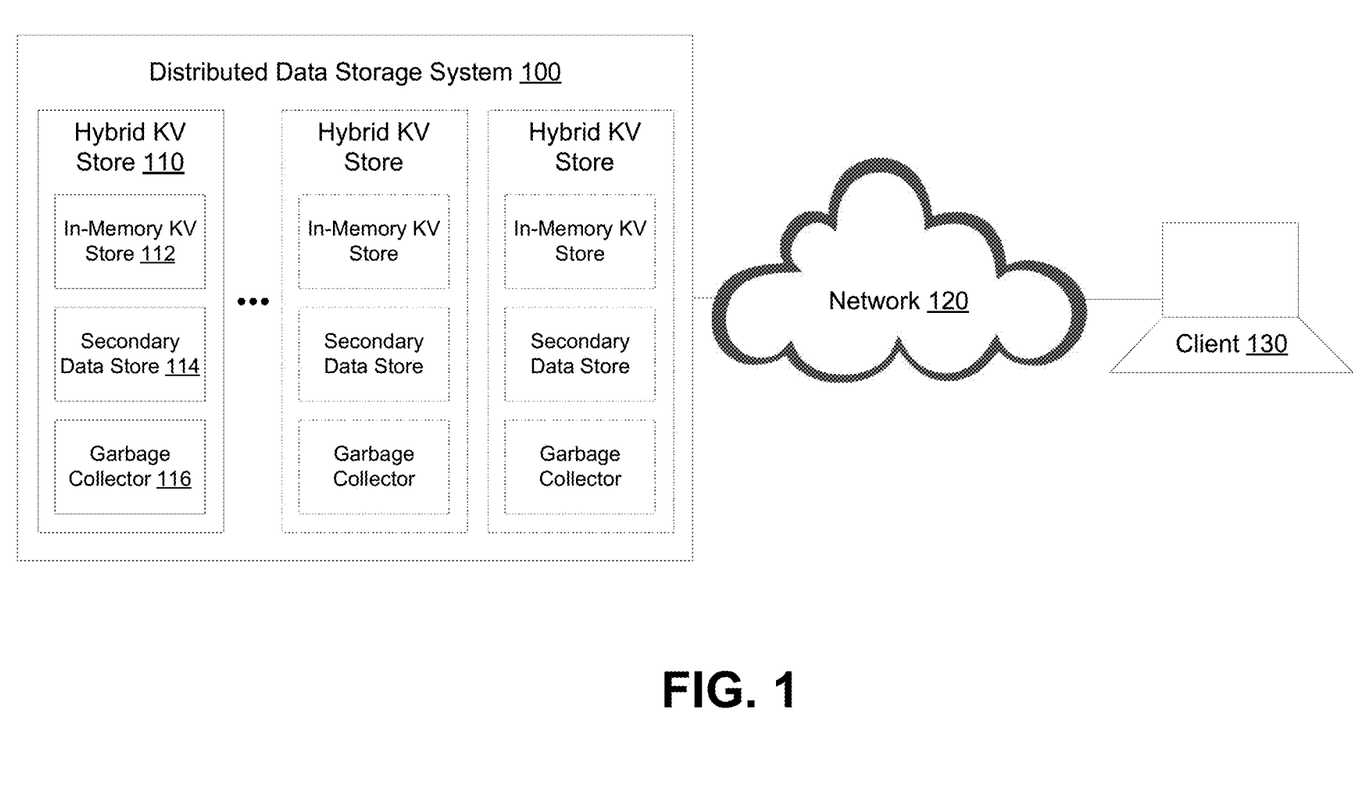
FIG. 1 depicts a system diagram illustrating a distributed data storage system consistent with some implementations of the current subject matter.

FIG. 1 depicts a system diagram illustrating a distributed data storage system 100 consistent with implementations of the current subject matter. Referring to FIG. 1, the distributed data storage system 100 can include one or more hybrid key-value stores including, for example, a hybrid key-value store 110. As shown in FIG. 1, the distributed data storage system 100 can be communicatively coupled, via a network 120, with a plurality of clients including, for example, a client 130. The network 120 can be any wired and/or wireless network including, for example, a public land mobile network (PLMN), a local area network (LAN), a virtual local area network (VLAN), a wide area network (WLAN), the Internet, and/or the like. In some implementations of the current subject matter, the client 130 can send, to the distributed data storage system 100, one or more queries including, for example, structured query language (SQL) statements and/or the like. The data required to respond to these queries form the client 130 can be stored in one or more of the plurality of hybrid key-value stores including, for example, the hybrid key-value store 110.

In some implementations of the current subject matter, each of the plurality of hybrid key-value stores can be deployed at a different location within the distributed data storage system 100 including, for example, a different data center, availability zone, rack, and/or computing node. Furthermore, one or more of the plurality of hybrid key-value stores can be configured to store a topology of the distributed data storage system 100. For example, the hybrid key-value store 110 (and/or a different hybrid key-value store) can store at least a portion of the key-value pairs corresponding to the objects forming the topology of the distributed data storage system 100 including, for example, tenants, data containers, data partitions, data centers, availability zones, racks, computing nodes, and/or the like.

Referring again to FIG. 1, the hybrid key-value store 110 can include an in-memory key-value store 112 and a secondary data store 114. The in-memory key-value store 112 can be implemented using any type of persistence that supports low latency access including, for example, random access memory (RAM) and/or the like. By contrast, the secondary data store 114 can be implemented using any type of persistence that supports high capacity storage including, for example, hard disk and/or the like. In some implementations of the current subject matter, smaller sized data records can be stored in the in-memory key-value store 112 whereas larger sized data records can be stored in the secondary data store 114. As used herein, smaller sized data records can refer to data records that are smaller than a threshold size (e.g., 2 kilobytes or a different size) whereas larger sized data records can refer to data records that are larger than the threshold size (e.g., 2 kilobytes or a different size).

In some implementations of the current subject matter, storing a key-value pair in the hybrid key-value store 110 can include dividing the key-value pair into a plurality of data records that include both smaller sized data records and larger sized data records. The smaller sized data records can hold the key associated with the key-value pair, a portion of the value associated with the key-value pair, references (e.g., pointers, page list, and/or the like) to other portions of the value associated with the key-value pair, and/or metadata associated with the key-value pair. Alternatively and/or additionally, the larger sized data records can hold portions of the value associated with the key-value pair that exceeds a threshold size (e.g., 2 kilobytes and/or a different size).

Figure 2:
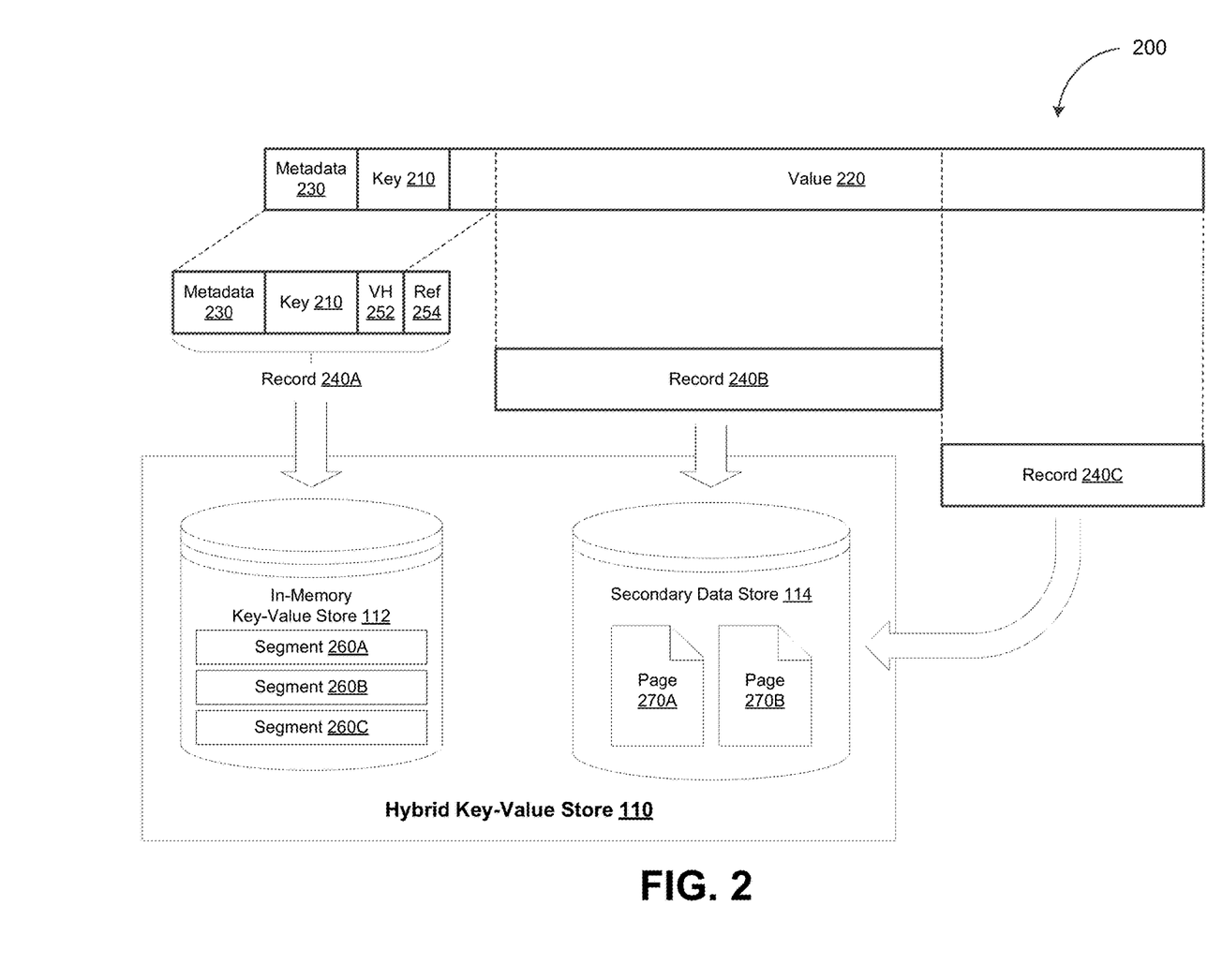
FIG. 2 depicts a plurality of data records corresponding to a key-value pair consistent with some implementations of the current subject matter.

To further illustrate, FIG. 2 depicts a plurality of data records corresponding to a key-value pair 200 consistent with implementations of the current subject matter. Referring to FIGS. 1-2, the key-value pair 200 can be stored in at least one of the plurality of hybrid key-value stores included in the distributed data storage system 100 including, for example, the hybrid key-value store 110. In some implementations of the current subject matter, the key-value pair 200 can correspond to an object in the topology of the distributed data storage system 100 including, for example, an object corresponding to a tenant, a data container, a data partition, a data center, an availability zone, a rack, a computing node, and/or the like.

Referring again to FIG. 2, the key-value pair 200 can include a key 210 and a value 220. Furthermore, the key-value pair 200 can include metadata 230. As noted, the metadata 230 can include a value of a version counter associated with the key-value pair 200, which can be indicative of the version of the key-value pair 200 at the time when the key-value pair 200 is added to the hybrid key-value store 110. In some implementations of the current subject matter, storing the key-value pair 200 in the hybrid key-value store 110 can include dividing the key-value pair 200 into a plurality of data records including, for example, a first record 240A, a second record 240B, and a third record 240C.

As noted, in some implementations of the current subject matter, whether a data record is stored in the in-memory key-value store 112 and the secondary data store 114 can be determined based on a respective size of the data record. For instance, the data record can be stored in the in-memory key-value store 112 if the data record is smaller than a threshold size (e.g., 2 kilobytes and/or a different size). Alternatively and/or additionally, the data record can be stored in the secondary data store 114 if the data record is larger than the threshold size (e.g., 2 kilobytes and/or a different size). In some implementations of the current subject matter, the key-value pair 200 can be divided into at least one data record, for example, the first record 240A, that is less than the threshold size (e.g., 2 kilobytes and/or a different size) and can therefore be stored in the in-memory key-value store 112, for example, in a first segment 260A, a second segment 260B, or a third segment 260C. As FIG. 2 shows, the first record 240A can include the key 210, the metadata 230, and a value head 252 corresponding to a portion of the value 220. Furthermore, the first data record 240A can include a reference 254 to other portions of the value 220.

Alternatively and/or additionally, each of the second record 240B and the third record 240C can include one of the other portions of the value 220. The second record 240B and/or the third record 240C can exceed the threshold size (e.g., 2 kilobytes and/or a different size) and are therefore stored in the secondary data store 114 instead of the in-memory data store 112. For instance, the second record 240B can be stored in a first page 270A in the secondary data store 114 while the third record 240B can be stored in a second page 270B in the secondary data store 114. As noted, the first record 240A can include the reference 254 to other portions of the value 220. Accordingly, in some implementations of the current subject matter, the reference 254 can include a page list of the pages including, for example, the first page 270A and the second page 270B, holding the other portions of the value 220.

In some implementations of the current subject matter, memory space in the in-memory key-value store 112 can be organized into memory segments (e.g., the first segment 260A, the second segment 260B, and/or the third segment 260C) having a fixed size (e.g., 64 kilobytes and/or a different size). Meanwhile, memory space in the secondary data store 114 can be organized into fixed sized and/or variable sized pages. For instance, the first page 270A and/or the second page 270B in the secondary data store 114 can be 2 kilobytes, 4 kilobytes, 16 kilobytes, 64 kilobytes, 256 kilobytes, and/or 1 megabyte in size. Different sized pages can be allocated to accommodate portions of the key-value pair 200 which, as noted, can be divided into multiple data records including, for example, the first record 230A, the second record 230B, and the third record 230C. For example, suppose the key-value pair 200 is 261 kilobytes in size. As such, the first record 230A can be a 1-kilobyte data record, which can be stored in the in-memory key-value store 112, for example, in the first segment 260A, the second segment 260B, or the third segment 260C. Alternatively and/or additionally, the second record 240B can be a 256-kilobyte data record that can be stored in the first page 270A, which can be a 256-kilobyte page. Furthermore, the third record 240C can be a 4-kilobyte data record that can be stored in the second page 270B, which can be a 4-kilobyte page.

As noted, the metadata 230 associated with the key-value pair 200 can include a value of a version counter associated with the key-value pair 200. This value of the version counter can be indicative of the version of the key-value pair 200 at the time when the key-value pair 200 is added to the hybrid key-value store 110. In some implementations of the current subject matter, when a current version of the key-value pair 200 is added to the hybrid key-value store 110, a current version of the first record 230A may be added to the in-memory key-value store 112. The current version of the first record 230A can be linked (e.g., via a pointer) to the previous version of the first record 230A. Furthermore, the in-memory key-value store 112 can include an index structure that includes links (e.g., pointers) to the most current version of each data record for the respective key in the in-memory key-value store 112 including, for example, the current version of the first record 230A. This index structure can be a tree, a hash table, and/or the like.

In some implementations of the current subject matter, executing a query from the client 130 can require locating the key-value pair 200 within the hybrid key-value store 110. As such, a lookup of the index structure can be performed in order to locate, in the in-memory key-value store 112, the first record 230A associated with the key-value pair 200. It should be appreciated that the query from the client 130 can, in some instances, be resolved based on the value head 252 included in the first record 230A alone. Alternatively and/or additionally, executing the query can require retrieving the second record 230B and/or the third record 230C from the secondary data store 114. As noted, the second record 230B and the third record 230C can include the remaining portions of the value 220. The second record 230B and the third record 230C can be located based on the reference 254 included in the first record 230A.

Referring again to FIG. 1, the hybrid key-value store 110 can further include garbage collector 116 configured to identify and/or remove data records from the in-memory key-value store 112. Removing one or more data records from the in-memory key-value store 112 can reclaim memory space in the in-memory key-value store, which can then be used for storing new data records added to the in-memory key-value store 112. For instance, obsolete versions of data records can be removed from the in-memory key-value store 112 and replaced with more current versions of the same and/or different data records.

In some implementations of the current subject matter, the garbage collector 116 can identify and remove data records based on the value of the version counter associated with each data record currently occupying the in-memory key-value store 112. For instance, the garbage collector 116 can identify and remove, from the in-memory key-value store 112, versions of data records that are no longer current. That is, the garbage collector 116 can, in some implementations of the current subject matter, identify and remove one or more data records that are not the most current versions of these data records from the in-memory key-value store 112. Alternatively and/or additionally, where the garbage collector 116 is implementing multi-version concurrency control (MVCC), the garbage collector 116 can remove all versions of data records that are older than the least recent reader accessing the hybrid key-value store 110.

According to some implementations of the current subject matter, the garbage collector 116 can perform garbage collection when one or more memory segments in the in-memory key-value store 110 are fully occupied but contain obsolete data records. Alternatively and/or additionally, the garbage collector 116 can perform garbage collection in order to consolidate data records into a fewer quantity of memory segments, thereby yielding one or more free memory segments that are completely unoccupied by any data records.

It should be appreciated that the garbage collector 116 can also identify and remove data records a variety of different techniques. For example, the garbage collector 116 can apply a least recently used (LRU) criterion to reclaim memory spaces occupied by data records that are access less recently than other data records in the in-memory key-value store 112. Alternatively and/or additionally, the garbage collector 116 can apply a time-to-live (TTL) criterion to reclaim memory spaces occupied by expired data records.

Figure 3A:
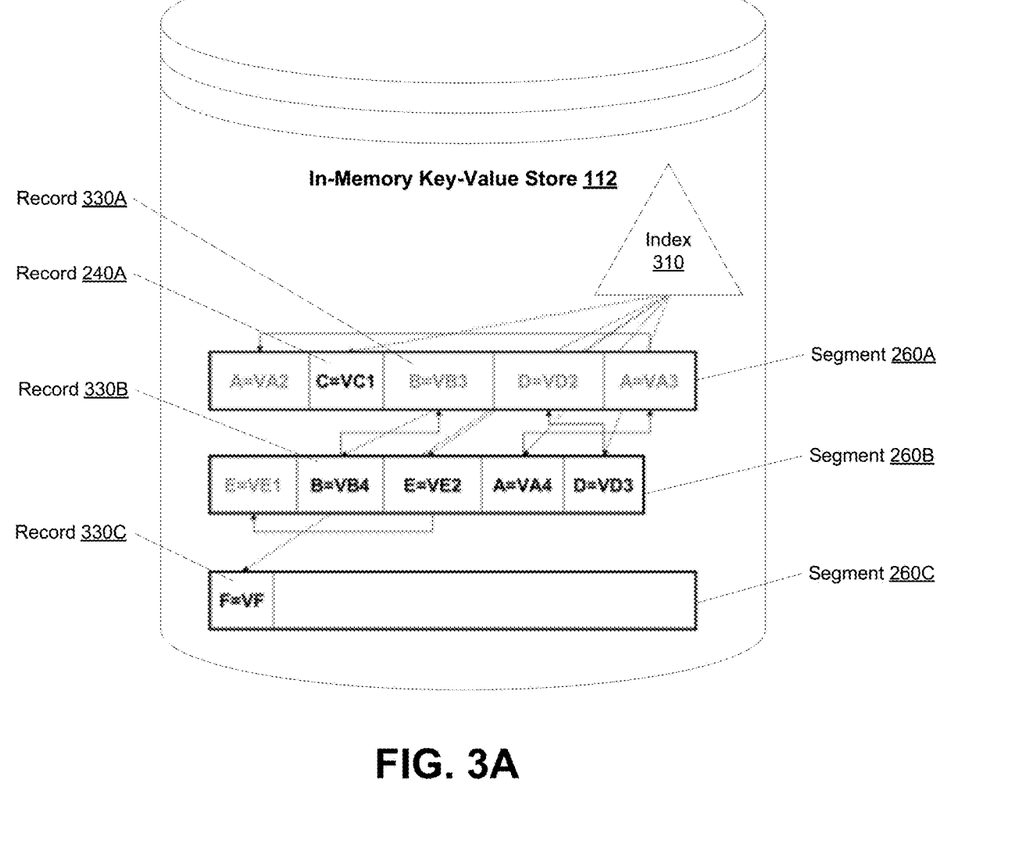
FIG. 3A depicts a garbage collection within an in-memory key-value store consistent with some implementations of the current subject matter.

To further illustrate, FIGS. 3A-B depict garbage collection within an in-memory key-value store consistent with some implementations of the current subject matter. Referring to FIG. 3A, the in-memory key-value store 112 can include a plurality of memory segments including, for example, the first segment 260A, the second segment 260B, and the third segment 260C. Each of the first segment 260A, the second segment 260B, and the third segment 260C can be occupied by a plurality of data records such as, for example, the first record 240A, a fourth record 330A, and/or a fifth record 330B.

In some implementations of the current subject matter, the garbage collector 116 can perform garbage collection to identify and remove, from the in-memory key-value store 112, obsolete data records. For example, the garbage collector 116 can identify and remove, from the in-memory key-value store 112, the fourth data record 330A because the fifth data record 330B is a more current version of the fourth data record 330A that renders the fourth data record 330A obsolete. As noted, obsolete data records such as, for example, the fourth data record 330A, can be removed from the in-memory key-value store 112 in order to reclaim memory space that can then be used for storing more current versions of the same and/or different data records (e.g., the fifth data record 330B). Furthermore, the in-memory key-value store 112 can include an index 310, which may include links to the current data records within the in-memory key-value store 112 (e.g., the first record 240A, the fifth record 330B, and/or a sixth record 330C).

Alternatively and/or additionally, the garbage collector 116 can perform garbage collection in order to consolidate data records from different memory segments into a fewer quantity of memory segments. In some implementations of the current subject matter, each memory segment in the in-memory key-value store 112 (e.g., the first segment 260A, the second segment 260B, and/or the third segment 260C) can be configured to track a quantity of free memory space within the segment. As used herein, free memory space can refer to unoccupied memory space and/or memory space that is occupied by data records subject to removal from the in-memory key-value store 112 (e.g., obsolete data records and/or the like).

According to some implementations of the current subject matter, the consolidation of data records can include iteratively identifying the memory segment having the largest quantity of free memory space and moving any non-obsolete data records into a memory segment that is serving as a buffer memory segment for the garbage collector 116. For example, referring to FIG. 3A, the garbage collector 116 can first identify the third segment 260C as having the largest quantity of free memory space. As such, the garbage collector 116 can move the sixth record 330C into a buffer memory segment. It should be appreciated that the any memory segment in the in-memory key-value store 112 having free memory space including, for example, the third segment 260C, can serve as a buffer memory segment. Accordingly, the garbage collector 116 can keep the sixth record 330C in the third segment 260C and/or move the sixth record 330C into the first segment 260A and/or the second segment 260B.

Figure 3B:
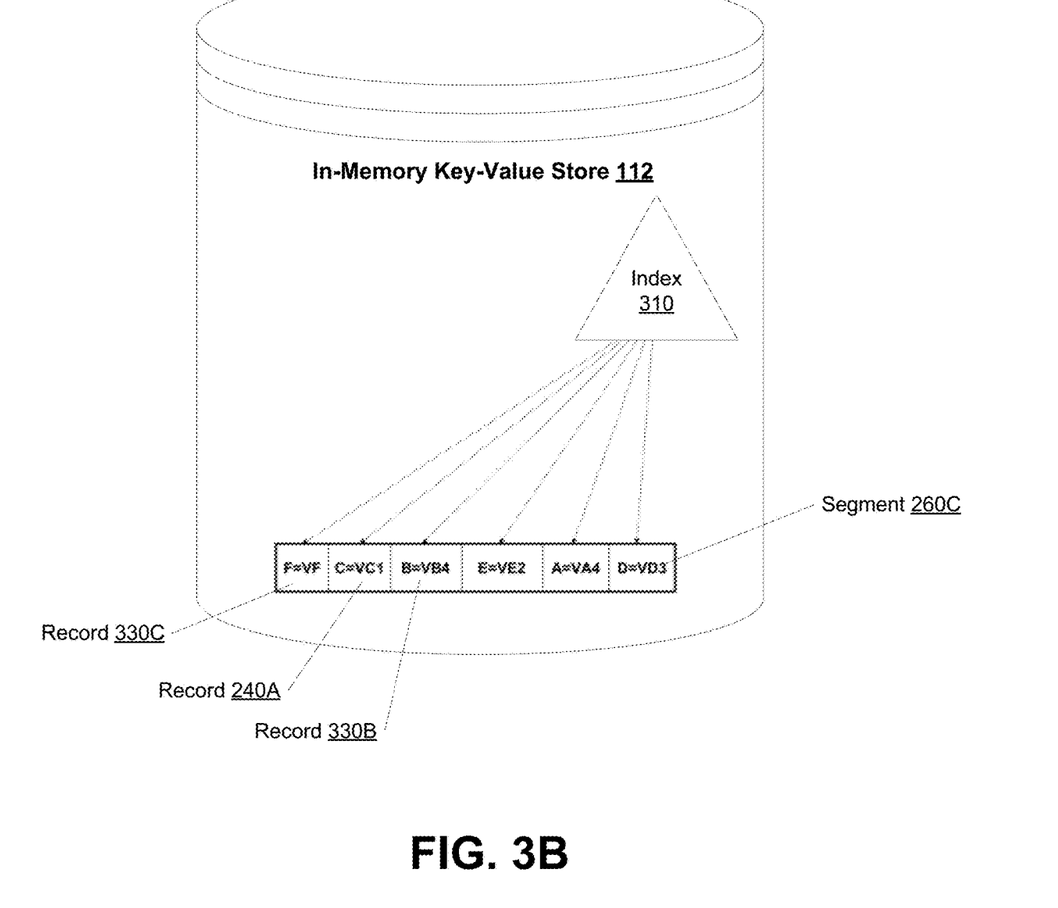
FIG. 3B depicts garbage collection within an in-memory key-value store consistent with some implementations of the current subject matter.

In some implementations of the current subject matter, after moving the sixth record 330C, the garbage collector 116 can continue the consolidation of data records by identifying the first segment 260A as having the next largest quantity of free memory space. Here, the garbage collector 116 can move the first record 240A into the third segment 260C, thereby leaving the first segment 260A as a completely unoccupied free memory segment. Upon moving the first record 240A, the garbage collector 116 can then identify the second segment 260B as having the next largest quantity of free memory space. The garbage collector 116 can move the non-obsolete data records included in the second segment 260B to the third segment 260C, thereby leaving the second segment 260B as a completely unoccupied free data segment. FIG. 3B depicts the in-memory key-value store 112 after non-obsolete data records from the first segment 260A, the second segment 260B, and/or the third segment 260C have been consolidated into a single memory segment such as, for example, the third segment 260C.

In some implementations of the current subject matter, each of the plurality of hybrid key-value stores included in the distributed data storage system 100 (e.g., the hybrid key-value store 110) can be associated with a state machine for tracking the mutations of key-value pairs stored in each hybrid key-value store. For example, the distributed data storage system 100 can take a snapshot of the state machine representative of one or more states of the hybrid key-value store 110. Furthermore, these snapshots can be stored in the secondary data store 114. The snapshots of the state machine representative of the one or more states of the hybrid key-value store 110 can be used, for example, to recover the hybrid key-value store 110 in the event of a failure.

As noted, modifying an existing key-value pair within the hybrid key-value store 110 can trigger the insertion of more current versions of data records into the in-memory key-value store 112. Storing these new data records into the in-memory key-value store 112 can require the allocation of one or more new memory segments within the in-memory key-value store 112. In some implementations of the current subject matter, the allocation of new memory segments within the in-memory key-value store 112 can also trigger the reservation of memory space (e.g., memory pages) in the secondary data store 114 for storing a snapshot of the hybrid key-value store 110 that includes at least one copy of these new memory segments. Each memory segment stored in the secondary data store 114 can be linked to a particular snapshot. Meanwhile, each snapshot of the hybrid key-value store 110 can include one or more of the memory segments stored in the secondary data store 114.

Figure 3C:
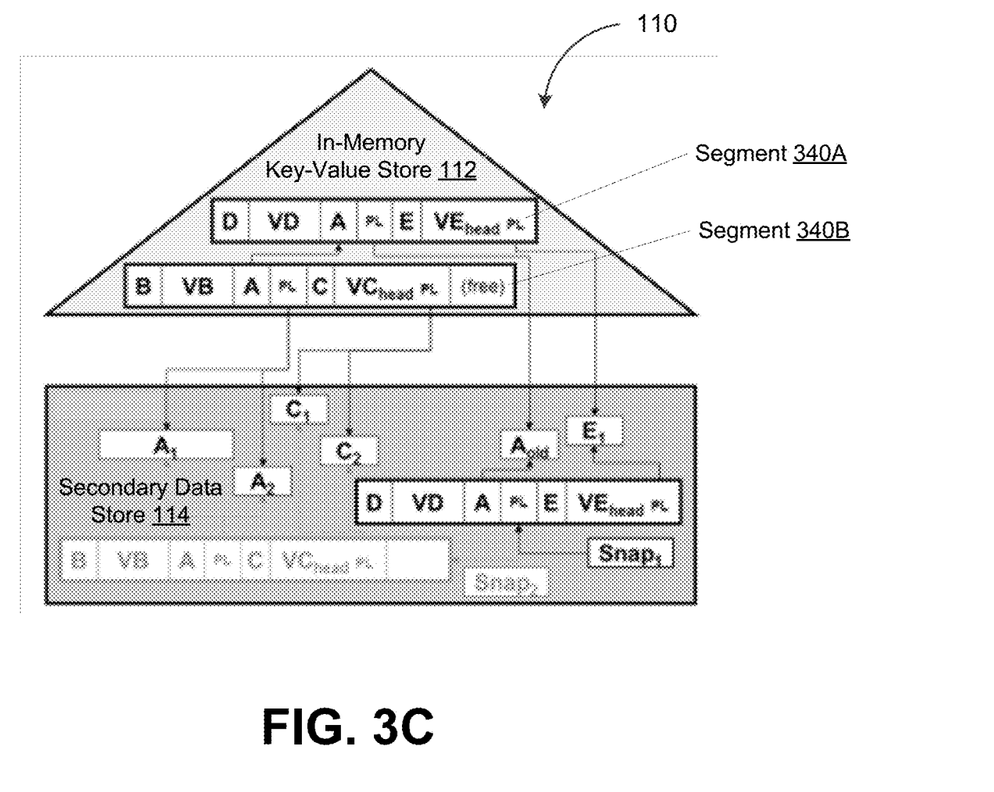
FIG. 3C depicts a hybrid key-value store including an in-memory key-value store and a secondary data store consistent with some implementations of the current subject matter.

To further illustrate, FIG. 3C illustrates the hybrid key value store 110 including the in-memory key-value store 112 and the secondary data store 114 consistent with some implementations of the current subject matter. Referring to FIG. 3C, the in-memory key-value store 112 can include a first segment 340A and a second segment 340B. Allocating the first segment 340A in the in-memory key-value store 112, for example, in order to store one or more data records, can trigger the reservation of memory space within the secondary data store 114 for storing a copy of the first segment 340A as part of a first snapshot (e.g., $Snap_1$) of a state machine representative of the hybrid key-value store 110. Alternatively and/or additionally, allocating the second segment 340B in the in-memory key-value store 112 can also trigger the reservation of memory space within the secondary data store 114 for storing a copy of the second segment 340B as part of a second snapshot (e.g., $Snap_2$) of a state machine representative of the hybrid key-value store 110. In some implementations of the current subject matter, the first snapshot (e.g., $Snap_1$) and/or the second snapshot (e.g., $Snap_2$) of the state machine can be used to recover the hybrid key-value store 110, for example, in the event of a failure.

Figure 4:
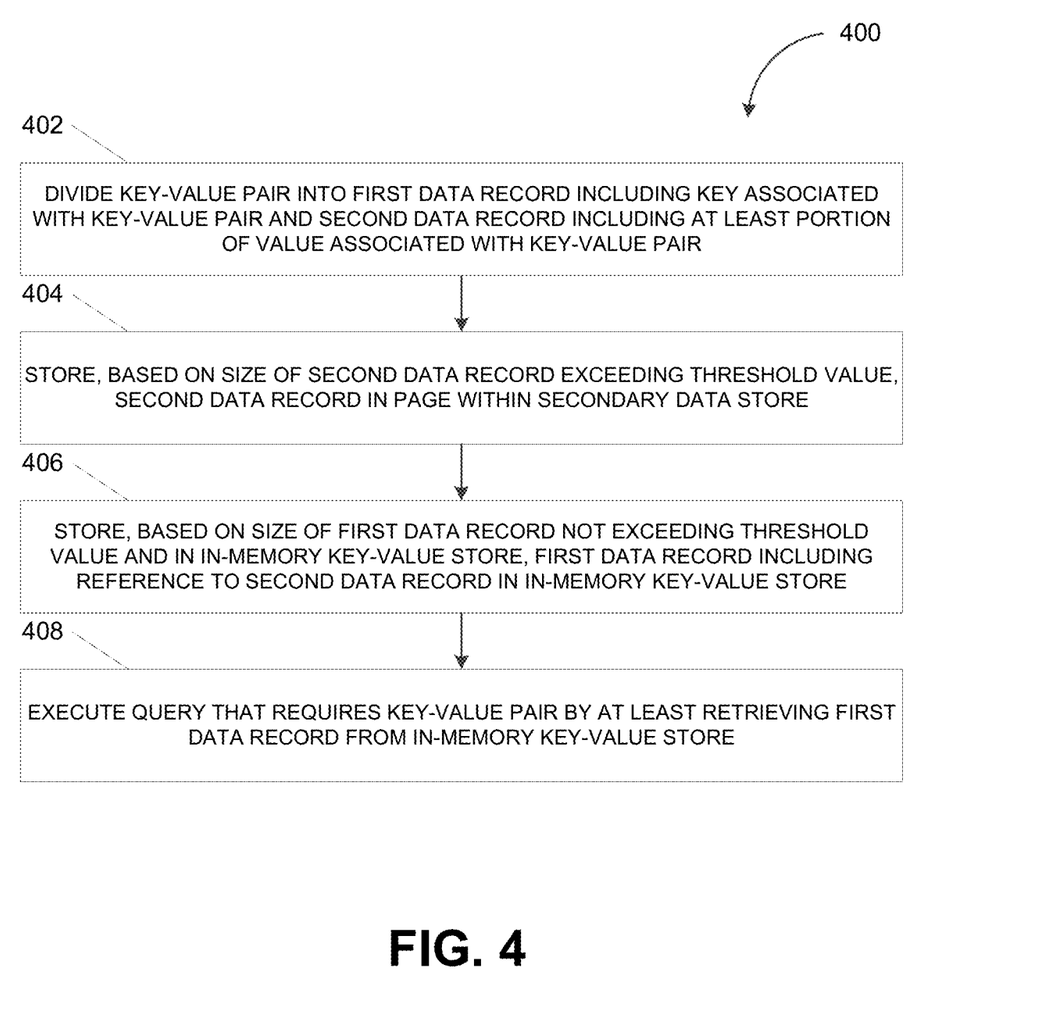
FIG. 4 depicts a flowchart illustrating a process for storing a key-value pair consistent with some implementations of the current subject matter.

FIG. 4 depicts a flowchart illustrating a process 400 for storing a key-value pair consistent with some implementations of the current subject matter. Referring to FIGS. 1-2, 3A-C, and 4, the process 400 can be performed by the distributed data storage system 100, for example, by the hybrid key-value store 110.

The hybrid key-value store 110 can divide a key-value pair into a first data record including a key associated with the key-value pair and a second data record including at least a portion of a value associated with the key-value pair (402). For example, the key-value pair 200 can be stored in the hybrid key-value store 110. Storing the key-value pair 200 can including dividing the key-value pair 200 into the first record 240A, the second record 240B, and the third record 240C. The first record 240A can include the key 210 associated with the key-value pair 200 while the second record 240B and/or the third record 240C can include portions of the value 220 associated with the key-value pair 200.

The hybrid key-value store 110 can store, based on a size of the second data record exceeding a threshold value, the second data record in a page within the secondary data store 114 (404). In some implementations of the current subject matter, data records that exceed a threshold size (e.g., 2 kilobytes and/or a different size) can be stored in the secondary data store 114 instead of the in-memory key-value store 112. As such, the second record 240B and/or the third record 240C can be stored in the secondary data store 114, for example, in the first page 270A and/or the second page 270B, if the second record 240B and/or the third record 240C exceed a threshold size and are too large for being stored in the in-memory key-value store 112.

The hybrid key-value store 110 can store, based on a size of the first data record not exceeding the threshold value and in the in-memory key-value store 112, the first data record including a reference to the second data record in the in-memory key-value store 112 (406). In some implementations of the current subject matter, a data record can be stored in the in-memory key-value store 112 only if that data record does not exceed a threshold size (e.g., 2 kilobytes and/or a different size). Otherwise, as noted, the data record can be stored in the secondary data store 114 instead of the in-memory key-value store 112. For example, the first record 240A can be stored in the in-memory key-value store 112.

As FIG. 2 shows, the first record 240A can include, in addition to the key 210 associated with the key-value pair 200, the reference 254 to the second record 240B and/or the third record 240C holding portions of the value 220 associated with the key-value pair 200. The reference 254 can be a page list that includes the first page 270A and/or the second page 270B, which may store the second record 240B and/or the third record 240C. Furthermore, the first record 240A can also include the metadata 230, which can include a value of a version counter associated with the key-value pair 200 that indicates the version of the key-value pair 200 at the time when the key-value pair 200 is added to the hybrid key-value store 110. Alternatively and/or additionally, the first record 240A can include the value head 252, which can include a portion of the value 220 associated with the key-value pair 200.

A query that requires the key-value pair can be executed by at least retrieving the first data record from the in-memory key-value store 112 (408). For example, the client 130 can send, to the distributed data storage system 110, a query that requires the key-value pair 200. In some implementations of the current subject matter, the value head 252 can include sufficient data for resolving the query from the client 130. As such, the query from the client 130 can be executed by retrieving only the first record 240A from the in-memory key-value store 112. Here, the presence of the value head 252 in the in-memory key-value store 112 can obviate the need to retrieve the second record 240B and/or the third record 240C from the secondary data store 114. Alternatively and/or additionally, the query can require portions of the value 220 that are included in the second record 240B and/or the third record 240C. Accordingly, executing the query from the client 130 can require retrieving the first record 240A from the in-memory key-value store 112. Furthermore, executing the query from the client 130 can require retrieving, based on the reference 254 included in the first record 240A, the second record 240B and/or the third record 240C from the secondary data store 114.

Figure 5:
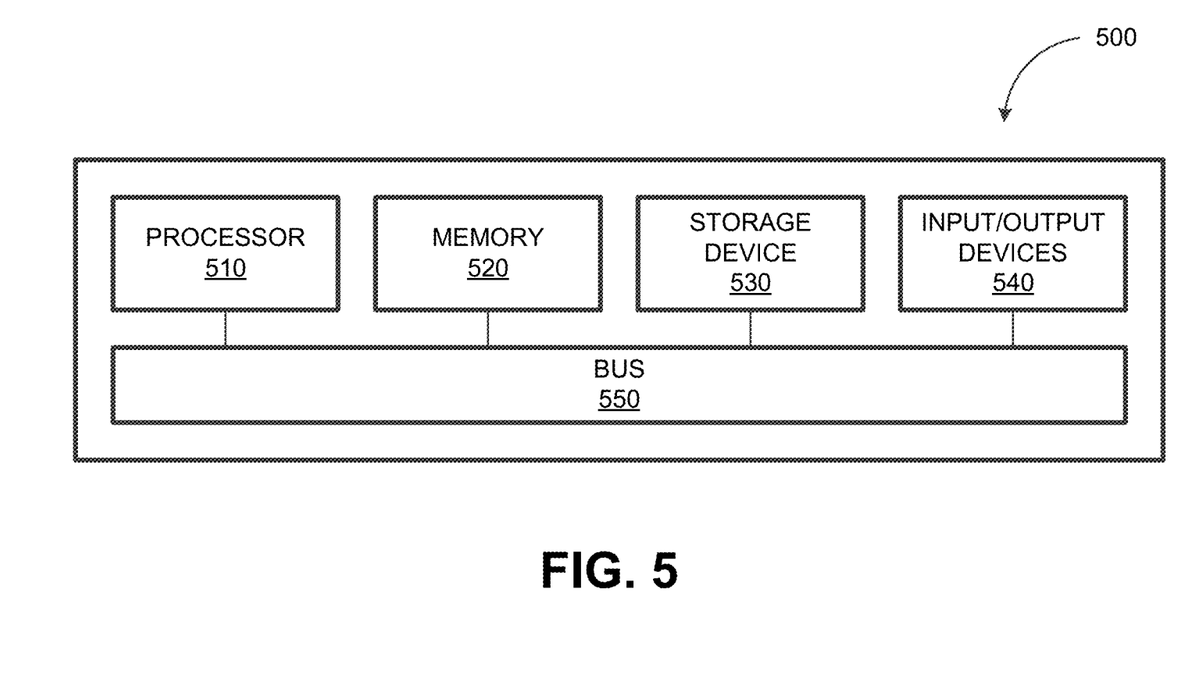
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1-5, the computing system 500 can be used to implement the distributed data storage system 100 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the distributed data storage system 100. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A distributed data storage system, comprising:
   at least one data processor; and
   at least one memory storing instructions which, when executed by the at least one data processor, cause operations comprising:
      dividing, into a first data record and a second data record, a key-value pair, the first data record including a key associated with the key-value pair, the second data record including a first portion of a value associated with the key-value pair;
      storing, based at least a size of the second data record exceeding a threshold value, the second data record in a secondary data store;
      storing, based at least on a size of the first data record not exceeding the threshold value, the first data record in an in-memory key-value store, the first data record including a reference to the second data record in the secondary data store; and
      executing a query that requires the key-value pair by at least retrieving, from the in-memory key-value store, the first data record.

2. The system of claim 1, wherein the first data record further includes a second portion of the value associated with the key-value pair, and wherein the query is executed based at least on the second portion of the value associated with the key-value pair.

3. The system of claim 1, wherein the execution of the query requires the first portion of the value associated with the key-value pair, and wherein the execution of the query further comprises retrieving, based at least on the reference included in the first data record, the second data record from the secondary data store.

4. The system of claim 1, further comprising:
   storing, in a first memory segment comprising the in-memory key-value store, the first data record.

5. The system of claim 4, further comprising:
   reclaiming at least a portion of memory space included in the first memory segment in order to store the first data record in the first memory segment, the portion of the memory space being reclaimed based at least on a third data record occupying the portion of the memory space being out-of-date, least recently used, and/or expired.

6. The system of claim 4, further comprising:
   consolidating the first data record in the first memory segment and a third data record in a second memory segment by at least moving the first data record and the third data record to a same memory segment.

7. The system of claim 4, further comprising:
   allocating the first data segment in order to store the first data record; and
   in response to the allocation of the first data segment, storing a copy of the first data segment in the secondary data store, the copy of the first data segment being stored as part of a snapshot of a hybrid key-value store comprising the in-memory key-value store and the secondary data store.

8. The system of claim 1, further comprising:
responding to a modification of the key-value pair by at least storing, in the in-memory key-value store, a current version of the first data record corresponding to the modified key-value pair, the current version of the first data record including a link to a previous version of the first data record that corresponds to key-value pair without the modification.

9. The system of claim 8, wherein the in-memory key-value store is associated with an index that includes the current version of the first data record but not the previous version of the first data record, and wherein the execution of the query includes performing a lookup of the index to locate the current version of the first data record.

10. The system of claim 8, wherein the first data record is associated with a version counter, and wherein a value of the version counter enables a differentiation between the current version of the first data record and the previous version of the first data record.

11. A computer-implemented method, comprising:
dividing, into a first data record and a second data record, a key-value pair, the first data record including a key associated with the key-value pair, the second data record including a first portion of a value associated with the key-value pair;
storing, based at least a size of the second data record exceeding a threshold value, the second data record in a secondary data store;
storing, based at least on a size of the first data record not exceeding the threshold value, the first data record in an in-memory key-value store, the first data record including a reference to the second data record in the secondary data store; and
executing a query that requires the key-value pair by at least retrieving, from the in-memory key-value store, the first data record.

12. The method of claim 11, wherein the first data record further includes a second portion of the value associated with the key-value pair, and wherein the query is executed based at least on the second portion of the value associated with the key-value pair.

13. The method of claim 11, wherein the execution of the query requires the first portion of the value associated with the key-value pair, and wherein the execution of the query further comprises retrieving, based at least on the reference included in the first data record, the second data record from the secondary data store.

14. The method of claim 11, further comprising:
storing, in a first memory segment comprising the in-memory key-value store, the first data record.

15. The method of claim 14, further comprising:
reclaiming at least a portion of memory space included in the first memory segment in order to store the first data record in the first memory segment, the portion of the memory space being reclaimed based at least on a third data record occupying the portion of the memory space being out-of-date, least recently used, and/or expired.

16. The method of claim 14, further comprising:
consolidating the first data record in the first memory segment and a third data record in a second memory segment by at least moving the first data record and the third data record to a same memory segment.

17. The method of claim 14, further comprising:
allocating the first data segment in order to store the first data record; and
in response to the allocation of the first data segment, storing a copy of the first data segment in the secondary data store, the copy of the first data segment being stored as part of a snapshot of a hybrid key-value store comprising the in-memory key-value store and the secondary data store.

18. The method of claim 11, further comprising:
responding to a modification of the key-value pair by at least storing, in the in-memory key-value store, a current version of the first data record corresponding to the modified key-value pair, the current version of the first data record including a link to a previous version of the first data record that corresponds to key-value pair without the modification.

19. The method of claim 18, wherein the in-memory key-value store is associated with an index that includes the current version of the first data record but not the previous version of the first data record, and wherein the execution of the query includes performing a lookup of the index to locate the current version of the first data record.

20. A non-transitory computer readable medium storing instructions, which when executed by at least one data processor, result in operations comprising:
dividing, into a first data record and a second data record, a key-value pair, the first data record including a key associated with the key-value pair, the second data record including a first portion of a value associated with the key-value pair;
storing, based at least a size of the second data record exceeding a threshold value, the second data record in a secondary data store;
storing, based at least on a size of the first data record not exceeding the threshold value, the first data record in an in-memory key-value store, the first data record including a reference to the second data record in the secondary data store; and
executing a query that requires the key-value pair by at least retrieving, from the in-memory key-value store, the first data record.

* * * * *